United States Patent [19]

Akita et al.

[11] Patent Number: 5,312,849
[45] Date of Patent: May 17, 1994

[54] PROCESS FOR PREPARATION OF RUBBER COMPOSITION AND RUBBER COMPOSITION

[75] Inventors: Shuichi Akita; Haruhisa Yamamoto, both of Yokohama, Japan

[73] Assignee: Nippon Zeon Co., Ltd., Tokyo, Japan

[21] Appl. No.: 8,991

[22] Filed: Jan. 26, 1993

[30] Foreign Application Priority Data

Jan. 31, 1992 [JP] Japan .................................. 4-042089

[51] Int. Cl.$^5$ .................................................. C08J 3/20
[52] U.S. Cl. ...................... 523/351; 525/332.5; 525/332.6; 525/332.7; 525/374; 525/379
[58] Field of Search ............. 523/351; 525/332.6, 525/332.7, 332.5, 374, 379

[56] References Cited

U.S. PATENT DOCUMENTS

| | | | |
|---|---|---|---|
| 4,550,142 | 10/1985 | Akita et al. | 525/236 |
| 4,647,625 | 3/1987 | Aonuma et al. | 528/232 |
| 4,677,153 | 6/1987 | Kitihara et al. | 524/552 |

FOREIGN PATENT DOCUMENTS 1193341 8/1989 Japan .

*Primary Examiner*—Paul R. Michl
*Assistant Examiner*—Edward Cain
*Attorney, Agent, or Firm*—Sherman and Shalloway

[57] ABSTRACT

A process for preparation of a rubber composition which comprises mixing a modified diene polymer wherein at least one functional group represented by the formula $>C=N^+<$ was bound to the main chain of the polymer or the main chain and terminal of the polymer directly or through another atomic group, with carbon black in an organic solvent, and separately the mixture of the modified diene polymer with carbon black from the resultant mixture solution.

12 Claims, No Drawings

PROCESS FOR PREPARATION OF RUBBER COMPOSITION AND RUBBER COMPOSITION

This invention relates to a process for preparation of a rubber composition suitable for rubber vibration insulators and tires excellent in abrasion resistance and rebound resilience and a rubber composition obtained by this process.

Requests for various rubber products wherein carbon black was compounded are increasing year by year. It is well known that various physical properties such as tensile strength, rebound resilience and abrasion resistance of a vulcanized rubber wherein carbon black was compounded are strikingly influenced by whether dispersion of carbon black is good or bad. As method for heightening the degree of dispersion of carbon black in a rubber composition, roughly three kinds of methods are known.

(1) A method which comprises adding carbon black into a solution or latex of rubber, whereas in a usual method carbon black and rubber are mixed in a solid state by a banbury mixer or the like.

. (2) A method which comprises increasing the degree of dispersion of carbon black in rubber by introducing a polar functional group capable of interacting with carbon black into the chain of the polymer constituting the rubber. For example, a method which comprises introducing a modifying agent such as an aminobenzophenone derivative into the terminal of a polymer chain (U.S. Pat. No. 4,550,142 and 4,647,625).

(3) A method which comprises dissolving in an organic solvent a terminal-modified polymer wherein a modifier selected from an isocyanate compound, a dialkylamino-substituted aromatic compound, a heterocyclic aromatic nitrogen compound, etc. was introduced into the terminal of the polymer chain, and mixing the solution with carbon black (Japanese Laid-Open Patent Publication No. 193341/1989).

Such a method as above heightens the degree of dispersion of carbon black in rubber, but does not sufficiently satisfy performance such as rebound resilience and abrasion resistance, and improvement is desired.

Thus, the object of this invention lies in providing a rubber composition capable of preparation of a rubber product wherein good dispersion of carbon black is attained and mechanical properties such as tensile strength are not lowered and which has improved abrasion resistance and rebound resilience.

According to this invention, a rubber composition consistent with such object can be prepared by a process which comprises mixing a modified diene polymer wherein at least one functional group represented by the formula $>C=N^+<$ is bound to the main chain of the polymer or the main chain and terminal of the polymer directly or through another atomic group, with carbon black in an organic solvent, and separating the mixture of the modified diene polymer with carbon black from the resultant mixture solution.

Examples of diene polymers to be used in this invention are homopolymers and copolymers of conjugated dienes such as 1,3-butadiene, isoprene and 1,3-pentadiene, copolymers of conjugated dienes with monomers copolymerizable therewith (for example, unsaturated nitrile compounds such as acrylonitrile, aromatic vinyl compounds such as styrene, vinyltoluene and α-methylstyrene, etc.), etc. Specific examples thereof are polybutadiene, polyisoprene, butadiene-isoprene copolymer, styrene-butadiene copolymer, styrene-isoprene copolymer, styrene-isoprene-butadiene copolymer, acrylonitrile-butadiene copolymer, etc. prepared by emulsion polymerization, solution polymerization or the like.

The main chain of a diene polymer referred to in this invention indicates the part of molecular chain other than the terminals of the molecular chain of the polymer. A main chain-modified diene polymer wherein a functional group represented by the formula $>C=N^+<$ is introduced into the main chain of a diene polymer can be prepared by two kinds of preparation methods exemplified below. Further, a modified diene polymer wherein such a functional group is bound to not only the main chain of the polymer but the terminal of the chain of the polymer can be prepared by using the below-exemplified first and second processes together or using the second process.

The first process is a process disclosed in U.S. Pat. No. 4,677,153, which comprises introducing such a functional group as above into the carbon-carbon unsaturated bonds in the main chain of a diene polymer. Specifically, such a main chain-modified diene polymer as above can be prepared by dissolving a diene polymer in an aromatic hydrocarbon solvent such as benzene, toluene or xylene, an aliphatic hydrocarbon solvent such as pentane, hexane, heptane or octane, an alicyclic hydrocarbon solvent such as cyclopentane or cyclohexane, or a halogenated hydrocarbon solvent such as methylene chloride or chloroform, and reacting it, in the presence of a Lewis acid, with an organic compound represented by the general formula $R_1—CH=N—R_2$ wherein $R_1$ and $R_2$ represent organic atomic groups and an organic acid halide.

Organic compounds represented by the general formula $R_1—CH=N—R_2$ include benzylidenemethylamine, benzylidenebutylamine, benzylideneaniline, benzylideneoctylamine, propylidenebutylamine, propylideneaniline, cyclohexylidenebutylamine, cyclohexylideneaniline, ethoxybenzylidenebutylaniline, 4-carboxylbenzylidenebutylaniline, 4-carbomethoxybenzylidenebutylamine, benzylidene-4-carboxylaniline, benzylidene-4-carboxylaniline, dimethylaminobenzylidenebutylaniline etc. Organic acid halides include acetyl chloride, acetyl bromide, benzoyl chloride, benzoyl bromide, carbomethoxybenzoyl chloride, oxalyl chloride, tetrephthaloyl chloride, etc.

Lewis acids include $BF_3$, $BF_3O(C_2H_5)_2$, $AlCl_3$, $TiCl_3$, $SnCl_4$, $SbCl_5$, $AgBF_4$, etc.

Although reaction conditions, etc. are not particularly limited, reaction is usually carried out at 20° to 80° C. for the order of 1 to 2 hours. The use quantities of the organic compound and the organic acid halide are on the order of 0.1 to 30 weight parts per 100 weight parts of the diene polymer, respectively.

The second process is a process, disclosed in U.S. Pat. Nos. 4,550,142 and 4,647,625, which comprises reacting the alkali metal of a diene polymer wherein an alkali metal is bound to the main chain with a later-described modifier such as an aminobenzophenone derivative.

A diene polymer wherein such a functional group as above is introduced into the terminal of the polymer chain can be prepared by polymerizing a conjugated diene monomer or the like in a hydrocarbon solvent using an alkali metal base catalyst and/or an alkaline earth metal base catalyst known to prepare a so-called anionic living diene polymer wherein the alkali metal and/or the alkaline earth metal are bound to the terminal of the polymer chain, and then reacting the polymer with a modifier.

Specifically, a main chain-modified diene polymer can be prepared by dissolving an above diene polymer in a hydrocarbon solvent such as benzene, toluene, xylene, pentane, hexane or heptane, adding an etherial additive such as tetrahydrofuran or an amine additive such as tetramethylethylenediamine, and adding an organic alkali metal compound, preferably an organic lithium compound, for example, an alkyllithium such as ethyllithium, n-propyllithium, isopropyllithium, n-butyllithium or sec-butyllithium, or N-methyl-N-benzyllithiumamide, N,N-dioctyllithiumamide, or the like to metallizing the main chain of the diene polymer with the alkali metal, and then reacting the metallized polymer with a modifier.

Alkali metallization of the diene polymer is carried out by reacting the organic alkali metal compound with the diene polymer at room temperature to 80° C., preferably 40° to 70° C. for several minutes to several hours. Then, a modifier such as an aminobenzophenone derivative described below is added at that temperature, and reacted with the metallized diene polymer for scores of minutes to several hours. Reaction conditions for introduction of the functional group into the terminal of the diene polymer chain are the same as in the case of the above modification of the main chain.

In case a diene polymer whose main chain and terminal are modified is prepared by the above-exemplified two processes, either (1) an anionic living diene polymer is first reacted with a modifier to prepare a terminal-modified diene polymer by the second process, and then this terminal-modified diene polymer is modified in the main chain by the first process, or (2) according to the second process, after a terminal-modified diene polymer is prepared, an alkali metal is added to the main chain of the polymer and a modifier is reacted therewith to modify the main chain. When the second process is used, the functional group is produced by hydrolyzing the modified diene polymer after the modification reaction. Hydrolysis is made when steam stripping, coagulation by addition of an alcohol or the like usually used in solution polymerization is carried out for separation of the modified diene polymer from the reaction system, and it is unnecessary to use a particular means.

Modifiers used in the above second method include N-substituted aminoketones, N-substituted aminothioketones, N-substituted aminoaldehydes and N-substituted aminothioaldehydes, and compounds having in the molecule an atomic group represented by the general formula

wherein X represents an oxygen atom or a sulfur atom.

Examples of N-substituted aminoketones and N-substituted aminothioketones are 4-dimethylaminobenzophenone, 4-diethylaminobenzophenone, 4-di-t-butylaminobenzophenone, 4-diphenylaminobenzophenone, 4,4'-bis(dimethylamino)benzophenone, 4,4'-bis(diethylamino)benzophenone, 4,4'-bis(di-t-butylamino)-benzophenone, 4,4'-bis(diphenylamino)benzophenone, 4,4'-bis(divinylamino)-benzophenone, 4-dimethylaminoacetophenone, 4-diethylaminoacetophenone, 1,3-bis(diphenylamino)-2-propanone, 1,7-bis(methylethylamino)-4-heptanone, etc. and thioketones corresponding thereto.

Preferred examples of N-substituted aminoaldehydes and N-substituted aminothioaldehydes are 4-dimethylaminobenzaldehyde, 4-diphenylaminobenzaldehyde, 4-divinylaminobenzaldehyde, etc., and thioaldehydes corresponding thereto.

Examples of compounds having the above atomic group in the molecule are N-substituted lactams such as N-methyl-β-propiolactam, N-t-butyl-β-propiolactam, N-phenyl-β-propiolactam, N-methoxyphenyl-β-propiolactam, N-naphthyl-β-propiolactam, N-methyl-2-pyrrolidone, N-t-butyl-2-pyrrolidone, N-phenyl-2-pyrrolidone, N-methoxy-phenyl-2-pyrrolidone, N-vinyl-2-pyrrolidone, N-benzyl-2pyrrolidone, N-naphthyl-2-pyrrolidone, N-methyl-5-methyl-2-pyrrolidone, N-t-butyl-5-methyl-2-pyrrolidone, N-phenyl-5-methyl-2-pyrrolidone, N-methyl-3,3'-dimethyl-2-pyrrolidone, N-t-butyl-3,3'-dimethyl-2-pyrrolidone, N-phenyl-3,3'-dimethyl-2-pyrrolidone, N-methyl-2-piperidone, N-t-butyl-2-piperidone, N-phenyl-2-piperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-phenyl-3,3'-dimethyl-2 -peridone, N-methyl-ε-caprolactam, N-pheny-ε-caprolactam, N-methoxyphenyl-ε-caprolactam, N-vinyl-ε-caprolactam, N-benzyl-ε-caprolactam, N-naphthyl-ε-caprolactam, N-methyl-ω-laurylolactam, N-phenyl-ω-laurylolactam, N-t-butyl-ω-laurylolactam, N-vinyl-ω-laurylolactam and N-benzyl-ω-laurylolactam and thiolactams corresponding thereto; N-substituted cyclic ureas such as 1,3-dimethyl-2-imidazolidinone, 1,3-diethyl-2-imidazolidinone, 1-methyl-3-ethyl-2-imidazolidinone, 1,3-dimethylethyleneurea, 1,3-diphenylethyleneurea, 1,3-di-t-butylethyleneurea and 1,3-divinylethyleneurea and N-substituted cyclic thioureas corresponding thereto; etc.

The use amount of an organic alkali metal compound to be used for alkali metallization of a diene polymer varies depending on the weight average molecular weight of the diene polymer, but usually is in the range of 0.3 to 6 m moles as the alkali metal atom per 100 weight parts of the polymer. The use amount of a modifier to be reacted after alkali metallization of the diene polymer is 0.1 to 10 equivalents, preferably 0.2 to 3 equivalents as the functional group per mole of the alkali metal atom bound to the polymer. Further, the use amount of a modifier to be reacted with an anionic living diene polymer wherein an alkali metal and/or an alkaline earth metal are bound to the terminal of the polymer is 0.1 to 10 equivalents, preferably 0.2 to 3 equivalents as the functional group per mole of the metal atom bound to the terminal.

According to the process of this invention, a modified diene polymer wherein the above functional group was introduced into the main chain or both principal chain and terminal of the diene polymer is mixed with carbon black in an organic solvent. The characteristics of this invention lie in mixing a solution of a modified diene polymer with carbon black in a solution, and lie in that much better dispersion of carbon black can be obtained which cannot be attained when the modified diene polymer of a solid state was mixed with carbon black using a usual mixer such as a banbury mixer and that rebound resiliance, abrasion resistance and mechanical properties are improved. Improvement effect is more remarkable in the case where the main chain and terminal of the diene polymer are modified than in the case where only the main chain was modified.

As a method for mixing a modified diene polymer with carbon black, although it is possible to separate the modified diene polymer once from the reaction system, dissolve it after drying in an organic solvent and mix the solution with carbon black, a method which comprises carrying out the reaction of modifying the diene polymer in an organic solvent (under a solution state), adding, after completion of the modification reaction, a predetermined amount of carbon black in the solution of the modified diene polymer and mixing the mixture under stirring is preferable because the labor of redissolution of the modified polymer is omitted. A particularly preferred method is a method which comprises preparing a diene polymer by solution polymerization (particularly anionic polymerization); either (1) carrying out main chain-modifying reaction after alkali metal addition reaction, or (2) reacting the living diene polymer having active terminal obtained in the polymerization with a modifier, binding an alkali metal to the formed terminal-modified diene polymer and then carrying out main chain modification; and adding carbon black in the reaction mixture of (1) or (2) and mixing them. In case of (2), it is also possible to carry out main chain modification and terminal modification simultaneously after binding of the alkali metal to the living diene polymer.

The addition amount of carbon black is not particularly limited and can appropriately be determined depending on the use purpose of the rubber composition of this invention, but is usually in the range of 10 to 200 weight parts per 100 weight parts of a modified diene polymer. Mixing can be carried out at a temperature of 0° to 150° C., preferably at a temperature of 50° to 130° C. It is possible to add, if necessary, an age resister, an extension oil such as an aromatic or naphthene process oil, etc. at the time of mixing. After adequate mixing, the mixture (rubber composition) of the modified diene polymer with carbon black is separated by steam stripping or by addition of a known coagulant such as an alcohol or the like, and dried by any drying means, whereby a rubber composition of this invention can be obtained.

The kind of carbon black to be used is not particularly limited, and can appropriately be selected in accordance with the use purpose of the rubber composition of this invention. Any of soft carbons such as FEF and GPF and hard carbons such as MAF, IISAF, ISAF and SAF can suitably be used. Particularly, even in case a carbon black is used which has a particle size smaller than that of SAF and is difficult to knead with rubber mechanically, the effect of dispersibility improvement is remarkable.

The rubber composition of this invention can, if necessary, be used by mixing it with another rubber. There can be used as other rubbers one or more selected from natural rubber, high cis-polyisoprene, emulsion polymerized styrene-butadiene copolymer rubber, solution polymerized styrene-butadiene copolymer rubber (having bound styrene of 0 to 50 weight % and a vinyl content of 10 to 90%), high cis-polybutadiene obtained using a catalyst utilizing as a base material a transition metal such as nickel, cobalt, titanium or neodymium, ethylene-propylene-diene terpolymer rubber, halogenated butyl rubber, halogenated ethylene-propyrene-diene terpolymer rubber, acrylonitrile-butadiene copolymer rubber, etc.

An age resister, an extension oil such as an aromatic or naphthene process oil, a processing additive, an antiozonant, a vulcanizing agent, etc. can, if necessary, be compounded in a rubber composition of this invention.

A rubber composition obtained by the process of this invention which comprises mixing a diene polymer whose main chain or both principal chain and terminal are modified with carbon black in a solution is excellent in dispersibility of carbon black and improved remarkably in rebound resiliance and abrasion resistance of its vulcanizate, compared to a rubber composition obtained by a conventional process which comprises mixing solid rubber with carbon black using a mixer such as a banbury mixer. Therefore, a rubber composition obtained by the method of this invention is suitably used as a raw material for various industrial materials such as rubbers for the tread part and the side wall part of tires and rubber vibration insulators, and particularly suitable for preparation of tire treads.

This invention is more detailedly described below referring to examples. The use part numbers and % in examples and comparative examples are based on weight unless otherwise defined. Further, various measurements are carried out as follows.

The vinyl bond content and the styrene content of the polymer were determined by infrared spectroscopic analysis [Hampton, Anal. Chem., 21, 923 (1949)]. The molecular weight of a polymer is weight average molecular weight based on a weight average molecular weight of standard polystyrene measured by GPC (using HPLC produced by Toso Co. and using each one of G4OOOHXL and G5OOOHXL as columns).

Mechanical properties (tensile strength and elongation) are measured according to JIS K6301.

Rebound resiliance was measured at 60° C. according to JIS K6301 using a Ryupuke type rebound resiliance testing machine.

Abrasion resistance was measured according to ASTM D-2228 using a pico-abrasion tester.

EXAMPLE 1

2600 ml toluene and 250 g of an emulsion polymerized styrene-butadiene copolymer (referred to as E-SBR : Nipol 1502 produced by Nippon Zeon Co., Ltd.) were put in a five-liter flask whose atmosphere had been replaced with nitrogen and which had been equipped with a stirrer, a nitrogen gas inlet tube and a reflux condenser, E-SBR was dissolved in toluene, and the inner temperature was adjusted to 50° C. To this was added 15 ml of a toluene solution (2N) of a mixture of benzylideneoctylamine with acetyl chloride in a mole ratio of 1 to 1.2, 15 ml of a toluene solution of tin tetrachloride (2N) was then added, and reaction was carried out under stirring at 50° C. for 2 hours to make a main chain modification. After completion of reaction, 12 ml of methanol was added to stop the reaction. 125 g of HAF carbon black was added to this reaction solution, the mixture was mixed under stirring at 80° C. for 3 hours, di-tert-butyl-p-cresol was added as an age resister in an amount of 0.8 g per 100 g of the rubber, the rubber composition comprising the principal chain-modified E-SBR and carbon black was separated by steam stripping, and vacuum drying was carried out. The resultant rubber composition is referred to as A.

Separately, a rubber composition G was prepared under the same conditions as above except that E-SBR was substituted for the principal chain-modified E-SBR.

EXAMPLE 2

110 g of E-SBR used in Example 1 was put in a stainless steel-made reactor which had been washed and dried and has an inner capacity of two liters, its atmosphere was replaced with nitrogen, 800 g of cyclohexane was added, SBR was dissolved under stirring, and its inner temperature was adjusted to 40° C. 0.26 ml of tetramethylethylenediamine and 1.58 ml of solution of sec-butyllithium in hexane (1.09N) were added to this cyclohexane solution, and reaction (lithium metallization) was carried out at 40° C. for 2 hours with stirring of the contents. 0.2 ml of N-methylpyrrolidone was then added and reaction was continued for further 45 minutes (modification of the main chain). After the reaction was discontinued with addition of 3 ml of methanol, 55 9 of HAF carbon black was added, and .the mixture was mixed with stirring at 80° C. for 3 hours. Thereafter, the same operation as in Example 1 was carried out to obtain a rubber composition B.

EXAMPLE 3

800 g of cyclohexane, 40 g of styrene, 120 g of 1,3-butadiene and 2.0 m moles of tetramethylethylenediamine were put in a stainless steel-made polymerization reactor having an inner capacity of 2 liters, and polymerization reaction was carried out at 50° C. for 2 hours with addition of 1.0 m mole of n-butyllithium. 1.05 m moles of methanol was added and the mixture was stirred at room temperature for 1 hour to stop the polymerization (the resultant polymer is referred to as S-SBR). To this polymer solution were added 12 ml of a toluene solution (2N) of a mixture in a mole ratio of 111.2 of benzylideneoctylamine/acetyl chloride and 12 ml of a toluene solution (2N) of tin tetrachloride. Reaction (modification of the main chain) was carried out under stirring at 50° C. for 2 hours, and then the reaction was stopped by addition of 10 ml of methanol. 80 g of HAF carbon black was added to this reaction solution, and the mixture was mixed with stirring at 80° C. for 3 hours. Thereafter, the same operations as in Example 1 were carried out to obtain a rubber composition C.

Separately, a rubber composition J was prepared under the same conditions as above except that S-SBR was substituted for the main chain-modified S-SBR.

EXAMPLE 4

0.5 m moles of tetramethylethylenediamine and 2.5 m moles of sec-butyllithium were added to the S-SBR solution obtained by polymerization under the same conditions as in Example 3, the mixture was stirred at 60° C. for 1 hour (lithium metallization), 3 m moles of N-methylpyrrolidone was added, and the mixture was further stirred at 60° C. for 1 hour to carry out reaction (modification of the main chain). The reaction was stopped with addition of 3 ml of methanol, 80 g of HAF carbon black was added, and the mixture was mixed under stirring at 80° C. for 3 hours. Thereafter, the same operations as in Example 1 were carried out to obtain a rubber composition D.

EXAMPLE 5

1.0 m mole of N-methylpyrrolidone was added to a solution of a living S-SBR wherein lithium is bound to the terminal, obtained by polymerization under the same conditions as in Example 3, and terminal modification reaction was carried out at 50° C. for 30 minutes. 12 ml of a toluene solution (2N) of a mixture in a mole ratio of 1/1.2 of benzylideneoctylamine/acetyl chloride was added to this reaction solution, 12 ml of a tin tetrachloride/toluene solution (2N) was then added, reaction (modification of the main chain) was carried out under stirring at 50° C. for 2 hours, and 10 ml of methanol was added to stop the reaction. 80 g of HAF carbon black was added to the reaction solution of the main chain- and terminal-modified S-SBR, and the mixture was mixed under stirring at 80° C. for 3 hours. Thereafter, the same operations as in Example 1 were carried out to obtain a rubber composition E.

Separately, a rubber composition L was prepared under the same conditions as above except that the terminal-modified S-SBR was substituted for the main chain- and terminal-modified S-SBR.

EXAMPLE 6

800 g of cyclohexane, 40 g of styrene, 120 g of 1,3-butadiene and 2.0 m moles of tetramethylethylenediamine were put in a stainless steel-made polymerization reactor having an inner capacity of 2 liters, 1.0 m mole of n-butyllithium was added, and polymerization reaction was carried out at 50° C. for 2 hours. After polymerization, 1.0 m mole of N-methylpyrrolidone was added, and terminal modification reaction was carried out at 50° C. for 30 minutes. 0.5 m mole of tetramethylethylenediamine and 2.5 m moles of sec-butyllithium were added to this reaction solution, the mixture was stirred at 60° C. for 1 hour (lithium metallization), 3 m moles of N-methylpyrrolidone was added, and the mixture was further stirred under stirring at 60° C. for 1 hour to carry out reaction (modification of the main chain). The reaction was stopped with addition of 3 ml of methanol, 80 g of HAF carbon black, and the mixture was mixed with stirring at 80° C. for 3 hours. Thereafter, the same operations as in Example 1 to obtain a rubber composition F.

S-SBR before the modification of the main chain in Examples 3 to 6 had a styrene content of 20% and a vinyl content of 70%. Its weight average molecular weight measured by GPC was 200,000.

EXAMPLE 7

Each one of the rubber compositions A to G, J and L obtained in the above examples and all the compounding ingredients of the compounding recipe (1) shown in Table 2 were mixed and kneaded on a roll to prepare a compounding rubber composition. The natures of the diene polymers used for the preparation of the rubber compositions were shown in Table 1.

Further, in accordance with the compounding recipe (2) shown in Table 2, each one of E-SBR of Example 1, the main chain-modified E-SBR of Example 1, S-SBR of Example 3, the main chain-modified S-SBR of Example 3 and the terminal-modified S-SBR of Example 5 was mixed with carbon black using a banbury mixer to prepare a rubber composition. Each one of the rubber compositions and all the compounding ingredients were mixed and kneaded on a roll to prepare a compounding rubber composition.

Each one of the above compounding rubber compositions was vulcanized by pressing it at 160° C. for 25 minutes to prepare test pieces, and mechanical properties, rebound resilience and abrasion resistance were measured. Abrasion resistance was expressed by indexes such that the results of the rubber compositions obtained using unmodified E-SBR and S-SBR respectively are supposed to be 100. It is denoted that the larger the value is than 100, the better abrasion resistance is. The above results are shown in Table 3 and Table 4.

TABLE 1

| Rubber composition | Diene polymer | Modifier main chain | Modifier terminal | Method for mixing with carbon black |
|---|---|---|---|---|
| A | E-SBR | BOA | — | In solution |
| B | E-SBR | NMP | — | " |
| C | S-SBR | BOA | — | " |
| D | S-SBR | NMP | — | " |
| E | S-SBR | BOA | NMP | " |
| F | S-SBR | NMP | NMP | " |
| G | E-SBR | — | — | " |
| H | E-SBR | — | — | Banbury mixer |
| I | E-SBR | BOA | — | " |
| J | S-SBR | — | — | In solution |
| K | S-SBR | — | — | Banbury mixer |
| L | S-SBR | — | NMP | In solution |
| M | S-SBR | — | NMP | Banbury mixer |
| N | S-SBR | BOA | NMP | " |

Note)
BOA: Benzylideneoctylamine
NMP: N-methylpyrrolidone

TABLE 2

| Compounding recipe | (1) | (2) |
|---|---|---|
| Diene polymer | 150 (*) | 100 |
| HAF carbon black | — | 50 |
| Stearic acid | 1.5 | 1.5 |
| Zinc oxide #1 | 3 | 3 |
| Aromatic process oil | 5 | 5 |
| Sulfur | 1.75 | 1.75 |
| N-cyclohexyl-2-benzothiazylsulfenamide | 1 | 1 |

(*) A mixture of the diene polymer (100 weight parts) with carbon black (50 weight parts)

TABLE 3

| | Example of this invention | | Comparative example | | |
|---|---|---|---|---|---|
| Experimental No. | 1 | 2 | 3 | 4 | 5 |
| Diene Polymer | | | E-SBR | | |
| Rubber composition | A | B | G | H | I |
| Tensile strength (*) | 301 | 310 | 288 | 280 | 280 |
| Elongation (%) | 450 | 510 | 510 | 500 | 420 |
| Rebound resiliance (%) | 65 | 66 | 58 | 57 | 61 |
| Abrasion resistance | 151 | 142 | 90 | 85 | 100 |

Note)
(*) Unit is Kg/cm$^2$

TABLE 4

| | Example of this invention | | | | Comparative example | | | | |
|---|---|---|---|---|---|---|---|---|---|
| Experimental No. | 6 | 7 | 8 | 9 | 10 | 11 | 12 | 13 | 14 |
| Diene Polymer | | | | | S-SBR | | | | |
| Rubber composition | C | D | E | F | J | K | L | M | N |
| Tensile strength (*) | 266 | 260 | 265 | 265 | 215 | 210 | 260 | 250 | 245 |
| Elongation (%) | 390 | 450 | 380 | 440 | 420 | 410 | 430 | 420 | 340 |
| Rebound resiliance (%) | 61 | 64 | 67 | 66 | 53 | 52 | 64 | 63 | 63 |
| Abrasion resistance | 140 | 138 | 155 | 150 | 91 | 90 | 95 | 95 | 100 |

Note)
(*) Unit is Kg/cm$^2$

Table 3 denotes the results of the rubber compositions A and B (examples of this invention) obtained by mixing the main chain-modified E-SBR with carbon black in the solution, the rubber composition I (comparative example) by a conventional mechanical mixing method (using the banbury mixer), the rubber composition G (comparative example) obtained by mixing the unmodified E-SBR with carbon black in the solution, and the rubber composition H by a conventional mechanical mixing method (using the banbury mixer). These results denote that by putting the process of this invention into practice are attained improvement of rebound resiliance better than any of the comparative examples, and improvement of abrasion resistance much better than that.

Table 4 denotes the results of the rubber compositions C and D (examples of this invention) obtained by mixing the main chain-modified S-SBR with carbon black in the solution, the rubber composition N (comparative example) by a conventional mechanical mixing method (using the banbury mixer), the rubber composition J (comparative example) obtained by mixing the unmodified S-SBR with carbon black in the solution, and the rubber composition K (comparative example) by a conventional method using the banbury mixer, the rubber compositions E and F (examples of this invention) obtained by mixing the main chain- and terminal- modified S-SBR with carbon black in the solution, the rubber composition L (comparative example) obtained by mixing the terminal-modified S-SBR with carbon black in the solution, and the rubber composition M (comparative example) by a conventional method. These results denote that in case of main chain modification, the same improvement as in use of E-SBR is made even by use of S-SBR, and in case both main chain and terminal were modified, impact resistance and abrasion resistance are remarkably improved by a synergetic action.

We claim:

1. A process for preparation of a rubber composition which comprises mixing a modified diene polymer wherein at least one functional group represented by the formula $>C=N^+<$ is bound to the main chain of the polymer or is bound to both the main chain and terminal of the polymer directly or through another atomic group, with carbon black in an organic solvent, and separating the mixture of the modified diene polymer with carbon black from the resultant mixture solution.

2. The process of claim 1 wherein the modified diene polymer is one obtained by reacting a diene polymer with an organic compound represented by the general formula $R_1—CH=N—R_2$ wherein $R_1$ and $R_2$ represent organic atomic groups and an organic acid halide in a solvent in the presence of a Lewis acid.

3. The process of claim 1 wherein the modified polymer is one obtained by reacting in an organic solvent a diene polymer wherein an alkali metal is bound to the main chain of the polymer, with at least one organic compound selected from the group consisting of N-substituted aminoketone(s), N-substituted aminothioketone(s), N-substituted aminoaldehyde(s), N-substituted aminothioaldehyde(s) and compound(s) having an atomic group represented by the general formula

wherein X represents an oxygen atom or sulfur atom.

4. The process of claim 1 wherein the modified diene polymer is one obtained by reacting in an organic solvent a living diene polymer having an active terminal obtained using an alkali metal or alkaline earth metal base catalyst, with at least one organic compound selected from the group consisting of N-substituted aminoketone(s), N-substituted aminothioketone(s), N-substituted aminoaldehyde(s), N-substituted aminothioaldehyde(s) and compound(s) having an atomic group represented by the general formula

wherein X represents an oxygen atom or sulfur atom, and then reacting the thus obtained diene polymer whose terminal is modified with an organic compound represented by the general formula $R_1\text{-CH}=\text{N}-R_2$ wherein $R_1$ and $R_2$ represent organic atomic groups and an organic acid halide in the presence of a Lewis acid.

5. The process of claim 4 wherein carbon black is added to the reaction mixture after completion of the modification reaction.

6. A rubber composition comprising the modified diene polymer and carbon black, obtained by the method of claim 1.

7. The process of claim 3 wherein carbon black is added to the reaction mixture after completion of the modification reaction.

8. The process of claim 2 wherein carbon black is added to the reaction mixture after completion of the modification reaction.

9. The process of claim 1 which comprises mixing 100 parts by weight of the modified diene polymer with from 10 to 200 parts by weight of carbon black.

10. The process of claim 1 wherein the step of separating comprises steam stripping the organic solvent from the mixture of the modified diene polymer with carbon black.

11. The process of claim 1 wherein the step of separating comprises adding a coagulant to the resultant mixture solution.

12. The rubber composition of claim 6 which comprises 100 parts by weight of the modified diene polymer and 10 to 200 parts by weight of carbon black.

* * * * *